Patented May 16, 1944

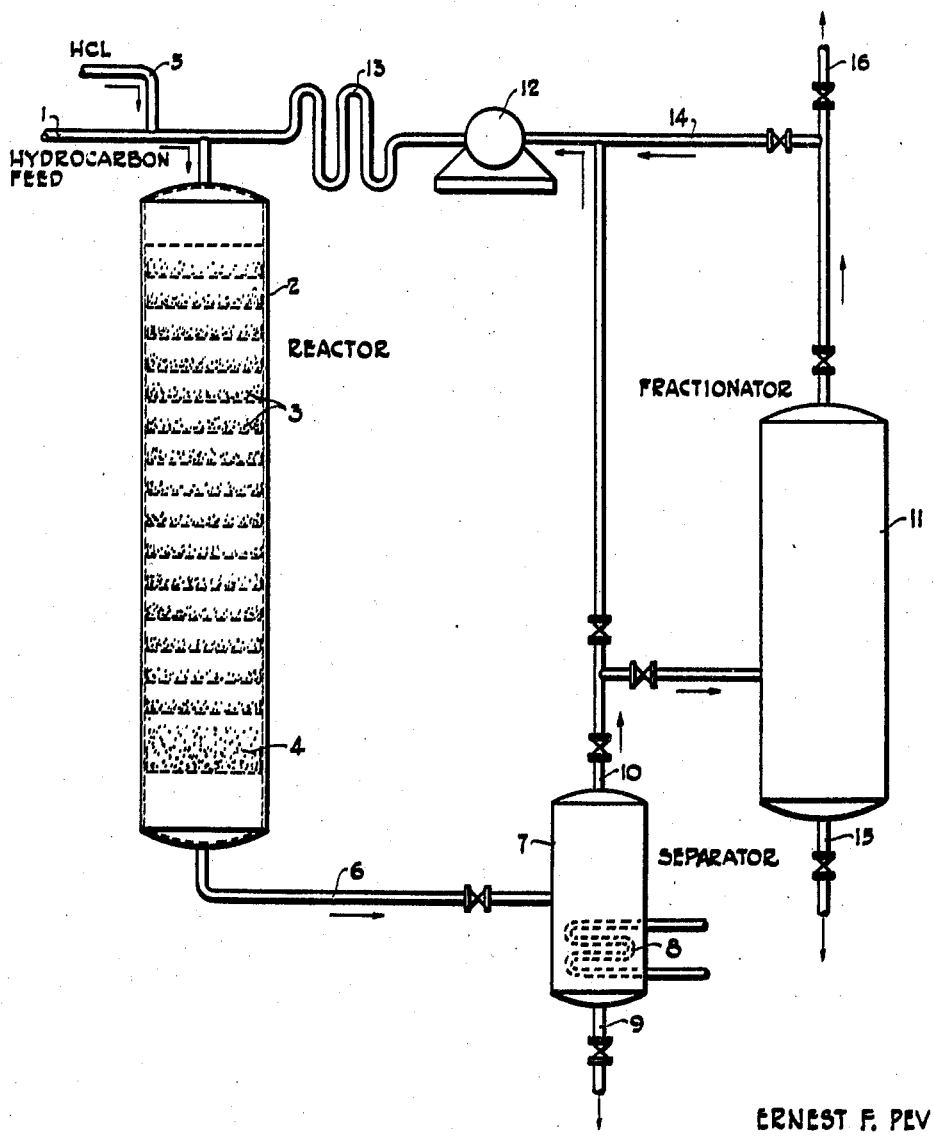

2,349,053

UNITED STATES PATENT OFFICE 2,349,053

CONVERSION OF HYDROCARBONS

Ernest Frank Pevere, Beacon, N. Y., assignor, by mesne assignments, to The Texas Company, New York, N. Y., a corporation of Delaware Application March 21, 1941, Serial No. 384,449

3 Claims. (Cl. 260—683.4)

This invention relates to thermal and catalytic conversion of hydrocarbons to effect molecular transformation thereof.

The invention broadly contemplates effecting molecular transformation of normally gaseous hydrocarbons to form hydrocarbons of higher molecular weight by reaction at elevated temperatures and pressures such that hydrocarbon products of reaction can be separated from the reaction mixture by retrograde condensation, and in that manner effecting such separation, at least in part.

More specifically the invention contemplates effecting thermal and catalytic condensation of normally gaseous hydrocarbons in a zone of reaction under temperature and pressure conditions which are substantially above the critical point for the reacting hydrocarbons. The resulting reaction mixture is subjected to retrograde condensation, advantageously in a zone of separation, to condense hydrocarbon reaction products which are withdrawn, the uncondensed hydrocarbons being recycled all or in part to the condensation reaction.

The process of this invention is applicable to condensation reactions which may be carried out above the critical temperatures of the reacting hydrocarbons. It is applicable to the alkylation of saturated and unsaturated hydrocarbons, and also to the polymerization of unsaturated hydrocarbons.

For example, the process of this invention may be employed in reacting normal paraffin hydrocarbons of about 2 to 3 carbon atoms per molecule with normally gaseous olefins of about the same number of carbon atoms per molecule in the presence of an alkylation catalyst whereby the paraffins are alkylated to produce saturated hydrocarbons of higher molecular weight. For example, normal paraffin hydrocarbons such as ethane and propane may be reacted with normally gaseous olefins such as ethylene and propylene in the presence of an active metallic halide type alkylation catalyst at a temperature in the range about 200 to 500° F. and while under a pressure of from several hundred up to about 5000 pounds per square inch gauge and preferably about 2000 to 3000 pounds. The resulting reaction mixture will comprise essentially saturated hydrocarbons such as normal butane, isobutane, pentanes and hexanes. This reaction mixture is advantageously passed to a separating zone wherein the temperature and pressure are reduced through and/or within the retrograde condensation range whereby substantial condensation of hydrocarbon reaction products occurs. The reaction products are drawn off and the uncondensed hydrocarbons are recycled, at least in part, to the alkylation reaction zone.

Retrograde condensation, as described in the article by George G. Brown entitled "Retrograde condensation and the critical phenomenon," published in the Proceedings of the 18th Annual Convention of the Natural Gasoline Association of America, held May 3–5, 1939, is that condensation which is brought about by reduction in pressure even though the temperature remains consant.

As described in the publication in question for every binary or other mixture of normally gaseous hydrocarbons there is a boundary on the pressure-temperature plane within which two phases exist, namely, a liquid phase and a gas phase, which phases are of slightly different composition. At temperatures and pressures outside this two-phase boundary the hydrocarbon mixture exists as a homogeneous fluid which is regarded as being in the liquid or in the gas phase depending upon the temperature and pressure. Some point on this two-phase boundary represents a critical point at which the liquid and gas phases are of the same composition.

Therefore, if the temperature and pressure of a mixture of hydrocarbons, which is already under conditions of temperature and pressure substantially above the critical, are reduced through the two-phase boundary retrograde condensation occurs as described in the foregoing publication.

An object of the present invention therefore involves effecting the conversion of the feed hydrocarbons under conditions substantially above the critical and then reducing the temperature and pressure of the resulting reaction mixture through the aforementioned two-phase boundary so as to effect substantially complete condensation of the products of reaction. The condensed products are thus separated from the uncondensed hydrocarbons including unreacted hydrocarbons which later may then be recycled to the conversion reaction.

It has been found that catalytic alkylation of ethane and propane with ethylene, propylene or mixtures thereof can be effected in the presence of a metallic halide catalyst under conditions of temperature and pressure which are substantially above the critical to produce a substantial yield of saturated paraffin hydrocarbons having less than 7 carbon atoms per molecule. By employing a high ratio of paraffin to olefin in the feed mixture the reaction can be effected without substantial polymerization of the olefins. Thus, the ratio of paraffin to olefin may vary from 5:1 to 30:1, and preferably in the range about 10:1 to 20:1.

It is desirable that the product of the reaction should be substantially free from higher molecular weight hydrocarbons which would tend to crack or decompose under the conditions prevailing during the reaction and thereby bring about deterioration of the catalyst.

Suitable catalysts for effecting the alkylation reaction of this invention comprise aluminum chloride and aluminum bromide as well as other metallic halides such as zirconium chloride.

The catalyst may be employed in lump or pulverulent form or may be employed in conjunction with suitable supporting material, for example, aluminum chloride, supported on activated alumina or supported on bauxite. Ceramic materials, such as saddle packing, quartz, etc., may be used, also the catalyst may be in the form of a supporting material impregnated with active catalytic agent.

In addition it is contemplated that a metallic halide type of catalyst may be used in the form of a metallic halide suspended in metallic halide-hydrocarbon complex or other fluid vehicle. Mixed halides of metals may be employed such as $AlCl_2F$.

In order to describe the invention more fully reference will now be made to the accompanying drawing, comprising a flow diagram illustrating one method of effecting catalytic alkylation operation in diagrammatic form.

A hydrocarbon feed which consists of 12 parts of propane and 1 part of ethylene by weight is drawn from a source not shown through a pipe 1 and introduced to the upper portion of a reactor 2.

The reactor comprises a vertical tower packed with a catalyst 3. The catalyst advantageously comprises alumina in pulverulent form impregnated with aluminum chloride, thereby forming a catalyst comprising about 80% alumina and about 20% aluminum chloride by weight. The catalyst may be supported within the tower as a single relatively deep bed or in the form of a plurality of relatively shallow beds.

Advantageously a shallow bed 4 of alumina is placed in the lower portion of the tower. The purpose of this bed of alumina is to provide means for retaining sublimed aluminum chloride that might be entrained in the hydrocarbon vapors passing through the outlet of the reactor 2.

Hydrogen chloride or other halogen halide promoter in small amounts is introduced to the reactor along with the charge through a pipe 5. The amount of promoter added is about 1% by weight on the basis of the hydrocarbon charge or may range from a trace to about 2% by weight of the hydrocarbon charge.

The hydrocarbon charge is introduced to the reactor at an elevated temperature so as to maintain a reaction temperature of about 250 to 325° F. The charge is also introduced under elevated pressure so as to maintain a pressure within the reactor in the range of about 3000 pounds per square inch gauge. The temperature and pressure conditions thus maintained within the reactor are substantially above the critical for the reacting hydrocarbons, as is indicated by comparing the critical temperatures and pressures for the following hydrocarbons:

|  | Critical temperature | Critical pressure |
| --- | --- | --- |
|  | °F. | Pounds |
| Ethylene | 48.7 | 744 |
| Ethane | 90 | 712 |
| Propane | 205 | 632 |
| Isopentane | 370 | 484 |
| Heptane | 512 | 394 |

The charging rate is regulated to provide a time of contact between the catalyst and hydrocarbons of about 40 minutes.

The reaction mixture together with any condensate collecting in the bottom of the reactor 2 is continuously drawn off through a pipe 6 to a separating vessel 7.

In the vessel 7 the temperature and pressure are reduced through the retrograde condensation range so as to obtain substantial condensation of hydrocarbon products. The separating vessel is provided with a cooling coil 8 by which means the temperature within the separator may be reduced.

The condensate collecting in the bottom of the separator is drawn off through a pipe 9 and may subjected to such further treatment as desired. For example, it may be desirable to subject the withdrawn condensate to fractionation to strip out retained normally gaseous and unreacted hydrocarbons, or to effect separation of the hydrocarbon mixture into desired fractions.

The unreacted hydrocarbons stripped from the withdrawn condensate may be recycled to the reactor 2 for further contact with the catalyst.

The uncondensed hydrocarbons accumulating in the upper portion of the separator vessel 7 are continuously drawn off through a valve controlled pipe 10 and may be all or in part conducted to a fractionator 11. On the other hand all or a portion of the gaseous hydrocarbons discharged through the pipe 10 may be passed directly to a compressor 12, passed through a heater 13 and recycled to the reactor 2.

It may be advantageous, however, to subject the discharged hydrocarbons to fractionation in the fractionator 11 so as to segregate a particular fraction thereof for recycling to the reactor 2. Thus a more volatile fraction may be separated and recycled through the pipe leading to compressor 12. A less volatile fraction, drawn off through pipe 15, may be recycled to the reactor 2, in which case the more volatile gases are discharged through pipe 16.

According to one modification of the process above described the separating vessel 7 may be employed for the purpose of accumulating entrained aluminum chloride and the hydrocarbon reaction mixture passed directly without substantial condensation to the tower 11 wherein the pressure and temperature are reduced, the reduction being effected under conditions such as to realize retrograde condensation.

The reaction mixture leaving the reactor 2 will contain hydrocarbons of higher molecular weight than propane in an amount which is substantially in excess of 100%, for example as high as 400% by weight based on the ethylene charge.

As indicating the character of the reaction mixture passing through the pipe 6 when operating under the conditions set forth above, a sample of the reaction mixture may be withdrawn from the pipe 6 and stabilized to remove $C_3$ and lighter hydrocarbons, the $C_3$ and lighter amounting to approximately 80% by volume of the sample. The resulting stabilized sample will have the following approximate composition:

| | |
|---|---|
| Isobutane | 49.12 |
| Normal butane | 31.22 |
| Butylenes | .25 |
| Isopentane | 14.45 |
| Normal pentane and heavier | 4.96 |

Thus, the $C_4$ and heavier hydrocarbons will constitute about 20% by volume of the reaction mixture passing through pipe 6 to the separator 7. By reducing the temperature and pressure in the separator 7 through the retrograde condensation range to a temperature of about 190 to 200° F. and a pressure of about 350 to 500 pounds per square inch gauge the resulting condensate will approximate 20% of the hydrocarbon mixture entering the separator.

The uncondensed hydrocarbons comprising unreacted hydrocarbons can be passed to the compressor 12, recompressed to the reaction pressure and thereafter passed to the heater 13 wherein they are heated to the reaction temperature prior to return to the reactor.

Instead of employing a single reaction tower as described above a plurality of reaction towers may be used with provision for passing the reacting hydrocarbons through the towers in series thereby permitting increased time of contact between reacting hydrocarbons and catalyst. If desired provision may be made for passing the paraffin hydrocarbons through the reactors in series flow while introducing the olefin feed hydrocarbons in portions to each of the reactors.

While a packed tower type of reactor has been described it is, of course, contemplated that a reaction vessel containing catalyst in the form of a fluid suspension may be used as previously indicated. In such case provision may be made for drawing off a portion of the catalyst and reacting mixture and continuously recycling it to the reactor so as to impart agitation. In such an operation the reacting hydrocarbons are caused to bubble through an agitated mass of the fluid catalyst.

When a fluid type of catalyst is used provision may be made for either concurrent or counter-current flow between the reacting hydrocarbons and the catalyst.

The charging rate to the reactor or reactors should be maintained so as to realize sufficient time of contact between the reacting hydrocarbons and the catalyst to effect the desired reaction. This time of contact may range from about 10 to 60 minutes. Also in order to effect the alkylation reaction it is essential to maintain a substantial molecular excess of paraffin over olefin in the reaction zone as previously indicated.

As indicated at the outset the process of this invention may be applied to other reactions such as polymerization. It may also be applied to the isomerization of hydrocarbons or hydrocarbon mixtures. In such case different conditions of temperature and pressure will be required depending upon the nature of the particular reaction. In any case these conditions are maintained such that they are above the critical point for the particular hydrocarbons undergoing treatment.

While carrying out the conversion reaction at temperature and pressure conditions substantially above the critical has been described above nevertheless it is contemplated that the reaction may be carried out under conditions extending within the retrograde condensation range for the liquefiable products of the reaction.

Obviously many modifications and variations of the invention, as hereinbefore set forth, may be made without departing from the spirit and scope thereof, and therefore only such limitations should be imposed as are indicated in the appended claims.

I claim:

1. A process for obtaining butane and heavier hydrocarbons from propane and ethylene which comprises passing feed hydrocarbons consisting essentially of propane and ethylene to an alkylation reaction zone in the proportion of about 5 to 30 parts propane to 1 part ethylene such that propane is in substantial molecular excess over the ethylene in the reaction zone, subjecting the propane and ethylene to contact in the reaction zone with aluminum halide in the presence of a small amount of hydrogen halide, effecting said contact at a temperature of about 250 to 325° F. and under a pressure of about 2000 to 3000 pounds such that propane and ethylene react without substantial polymerization of the olefin, withdrawing from the reaction zone a hydrocarbon mixture containing butane and heavier hydrocarbons in substantial amount and separating butane and heavier hydrocarbons from the withdrawn mixture.

2. A process for obtaining butane and heavier hydrocarbons from propane and ethylene which comprises passing feed hydrocarbon consisting essentially of propane and ethylene to an alkylation reaction zone in the proportion of about 5 to 30 parts propane to 1 part ethylene such that propane is in substantial molecular excess over the ethylene in the reaction zone, subjecting the propane and ethylene to contact in the reaction zone with aluminum halide in the presence of a small amount of hydrogen halide, effecting said contact at a temperature of about 250 to 325° F. and under a pressure of about 2000 to 3000 pounds such that propane and ethylene react without substantial polymerization of the olefin, withdrawing from the reaction zone without substantial reduction in pressure a mixture of reacted and unreacted hydrocarbons containing butane and heavier hydrocarbons, passing the withdrawn mixture without substantial reduction in pressure to a separating zone maintained at a temperature of about 190 to 200° F., expanding therein the withdrawn mixture from alkylation pressure to a pressure within the range about 350 to 500 pounds such that substantial condensation of normally liquid hydrocarbons occurs, withdrawing condensed hydrocarbons from the separating zone, separately withdrawing uncondensed hydrocarbons without further reduction in pressure and recycling at least a portion of said withdrawn uncondensed hydrocarbons to the alkylation reaction zone.

3. A process for obtaining butane and heavier hydrocarbons from propane and ethylene which comprises passing feed hydrocarbons consisting essentially of propane and ethylene to an alkylation reaction zone in the proportion of about 5 to 30 parts propane to 1 part ethylene such that propane is in substantial molecular excess over the ethylene in the reaction zone, subjecting the propane and ethylene to contact in the reaction zone with aluminum halide in the presence of a small amount of hydrogen halide, effecting said contact at a temperature of about 250 to 325° F. and under a pressure of about 2000 to 3000 pounds such that propane and ethylene react without substantial polymerization of the olefin, withdrawing from the reaction zone without substantial reduction in pressure a mixture of reacted and unreacted hydrocarbons containing butane and heavier hydrocarbons, passing the withdrawn mixture without substantial reduction in pressure to a separating zone maintained at a temperature of about 190 to 200° F., expanding therein the withdrawn mixture from alkylation pressure to a pressure within the range about 350 to 500 pounds such that substantial condensation of normally liquid hydrocarbons occurs, withdrawing condensed hydrocarbons from the separating zone, separately withdrawing uncondensed hydrocarbons, passing said uncondensed hydrocarbons to a fractionating zone, forming therein a volatile gaseous fraction and a less volatile fraction, discharging the less volatile fraction and recycling said volatile gaseous fraction at least in part to the alkylation reaction zone.

ERNEST F. PEVERE.